(No Model.)

J. W. CARTER.
STOP BLOCK FOR WAGONS.

No. 441,533. Patented Nov. 25, 1890.

Witnesses
Saml R. Turner:
Van Buren Hillyard.

Inventor
James W. Carter:
By his Attorneys
R. S. & A. P. Lacey

UNITED STATES PATENT OFFICE.

JAMES W. CARTER, OF TACOMA, WASHINGTON.

STOP-BLOCK FOR WAGONS.

SPECIFICATION forming part of Letters Patent No. 441,533, dated November 25, 1890.

Application filed April 2, 1890. Serial No. 346,358. (No model.)

*To all whom it may concern:*

Be it known that I, JAMES W. CARTER, a citizen of the United States, residing at Tacoma, in the county of Pierce and State of Washington, have invented certain new and useful Improvements in Stop-Blocks; and I do hereby declare the following to be a full, clear, and exact description of the invention, such as will enable others skilled in the art to which it appertains to make and use the same.

This invention relates to stop-blocks for vehicles, and has for its object to attach a block to a wagon or other vehicle in such a manner that it can be dropped under the wheel while resting team, and which when up can be carried in a safe and convenient manner.

The device consists of bracket-lever and block. The bracket is attached to hind bolster or axle of wagon, with either bolts or stirrup, and stands at such an angle to perpendicular of wheel that when lever is raised the block is carried to a point in the rear and inside of the wheel. The lever is provided with a slot at the point where it connects with bracket, to allow block to adjust itself to wheel on uneven and rutty road; and also, in backing wagon against an obstruction, to allow block to move up until it comes even with the wheel. The lever extends above connection at bracket sufficiently to give enough leverage to allow the block to be lifted with ease. This may be done either by rod connected with ratchet at front of wagon, or by cord running to some convenient place. The block may be made of any material and in any size or shape desired. I prefer hard wood block of triangular shape, large enough that loaded wagon will not run back over it on the steepest hills.

The device is designed to save teams from the necessity of holding loaded wagons on hills while resting, and also in case of breakage to drop under wheel and hold wagon until the break is repaired.

The improvement consists of the novel features which will be hereinafter more fully described and claimed, and which are shown in the accompanying drawings, in which—

Figure 1:
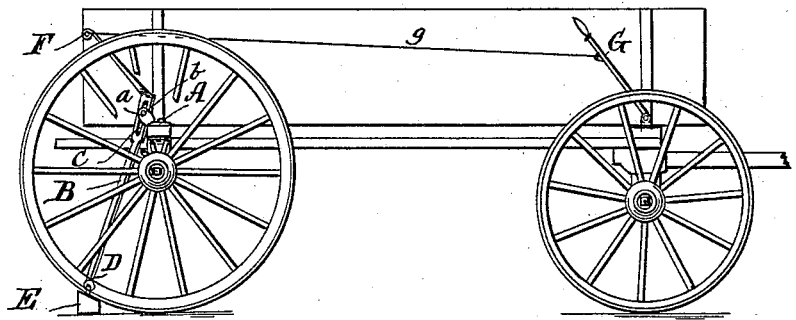
Figure 2:
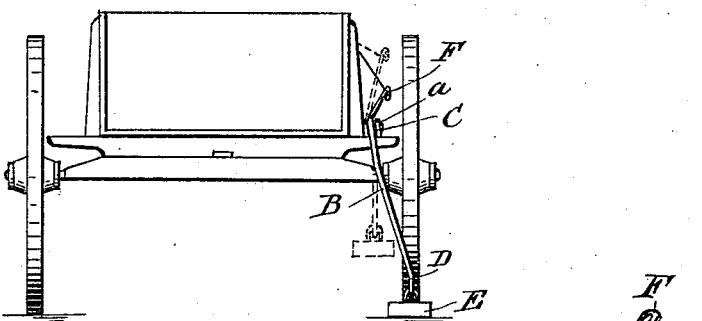
Figure 3:
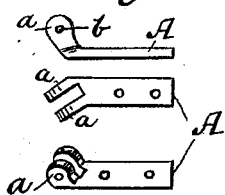
Figure 4:
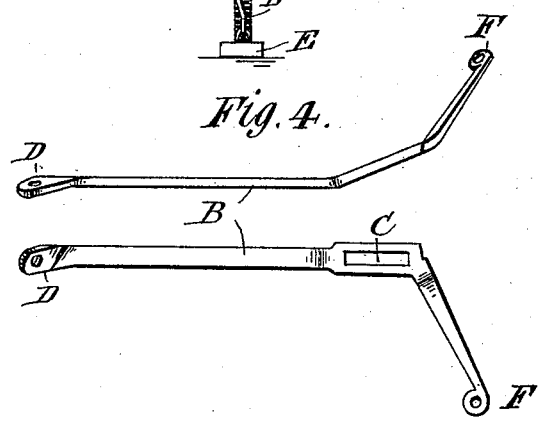

Figure 1 is a side view of a vehicle, showing the application of my invention. Fig. 2 is a rear view showing the block in active position by full lines and up out of the way by dotted lines. Fig. 3 is a side top plan and perspective view of the bracket. Fig. 4 is a top plan and a side view of the lever.

A is the bracket, which is secured to the vehicle in any convenient manner to secure the best results. The lugs or ears $a\ a$, projecting up from and forming part of the bracket, incline to the perpendicular and receive the lever B, which is placed between them and mounted on the bolt C, which passes through the said lugs and through slot $b$ in the said lever. The slotted portion of the lever is straight, and the lower portion D is deflected outward for the purpose of carrying the block E, which is secured to its lower end beneath the wheel when the lever is lowered. The portion F of the lever above the slotted portion $b$ thereof inclines outwardly and rearwardly to clear the side of the vehicle. This lever B may be operated directly by hand or from the hand-lever G through rod $g$. The block E is triangular in cross-section, and has a loose connection with the lever B.

The operation of the invention is as follows: To chock the wagon or other vehicle in case the team halts when going uphill, or the harness breaks, or for any reason it becomes necessary to prevent the backward movement of the vehicle, the lever carrying the stop-block is operated to bring the said stop-block between the ground and the wheel, as most clearly shown in Figs. 1 and 2. By reason of the peculiar construction of the lever the block is carried to and from the plane of the wheel to the wheel when the lever is depressed, and from the wheel when the lever is raised so as to be out of the way.

Having thus described my invention, what I claim, and desire to secure by Letters Patent, is—

1. In a vehicle, the combination, with the body and a supporting-wheel thereof, of a bracket secured to the vehicle-body and having depending lugs, which incline to the perpendicular and to the line of draft of the vehicle, a lever constructed to move endwise and tilt between the said lugs, a brake-shoe secured to the lower end of the lever, and means for tilting and moving the said lever endwise between the said lugs, whereby the brake-shoe will be carried to and from the plane of the wheel and interposed between the said wheel and the ground, substantially as described.

2. The combination, with a vehicle, of a slotted lever, the pivotal support of the said lever passing through the said slot therein, the lower portion of the lever being deflected outwardly and the upper part of the lever being inclined outwardly and rearwardly, substantially as described.

In testimony whereof I affix my signature in presence of two witnesses.

JAMES W. CARTER.

Witnesses:
JOHN MAYO PALMER,
JAMES WICKERSHAM.